US012657694B2

(12) United States Patent
Bydlon et al.

(10) Patent No.: US 12,657,694 B2
(45) Date of Patent: Jun. 16, 2026

(54) IMAGE ENHANCEMENT BASED ON FIBER OPTIC SHAPE-SENSING

(71) Applicant: KONINKLIJKE PHILIPS N.V., Eindhoven (NL)

(72) Inventors: Torre Michelle Bydlon, Melrose, MA (US); Molly Lara Flexman, Melrose, MA (US); Raoul Florent, Ville D'Avray (FR); Roland Wilhelmus Maria Bullens, Mierlo (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 829 days.

(21) Appl. No.: 17/792,526

(22) PCT Filed: Jan. 11, 2021

(86) PCT No.: PCT/EP2021/050399
§ 371 (c)(1),
(2) Date: Jul. 13, 2022

(87) PCT Pub. No.: WO2021/144228
PCT Pub. Date: Jul. 22, 2021

(65) Prior Publication Data
US 2023/0005135 A1 Jan. 5, 2023

Related U.S. Application Data

(60) Provisional application No. 62/960,964, filed on Jan. 14, 2020.

(51) Int. Cl.
*G06T 7/00* (2017.01)
*G06V 10/25* (2022.01)

(52) U.S. Cl.
CPC ............ *G06T 7/0012* (2013.01); *G06V 10/25* (2022.01); *G06T 2207/10116* (2013.01); *G06T 2207/20172* (2013.01); *G06T 2207/30204* (2013.01)

(58) Field of Classification Search
CPC .... A61B 2034/2061; A61B 2034/2051; A61B 8/12; A61B 2034/301; A61B 5/066;
(Continued)

(56) References Cited

U.S. PATENT DOCUMENTS

| | | | |
|---|---|---|---|
| 7,289,652 B2 | 10/2007 | Florent | |
| 8,000,507 B2 | 8/2011 | Rongen | |

(Continued)

FOREIGN PATENT DOCUMENTS

| | | | |
|---|---|---|---|
| WO | 2003045263 A2 | 6/2003 | |
| WO | WO-2013144912 A1 * | 10/2013 | ............. A61B 34/20 |

OTHER PUBLICATIONS

International Search Report and Written Opinion of PCT/EP2021/050399, dated Mar. 12, 2021.
Mishell, Jacob M. et al. "Determination of Adequate Coronary Stent Expanion using StentBoost, a Novel Fluoroscopic Image Processing Technique", Catheterization and Cardiovascular Interventions, vol. 69, 2007, pp. 84-93.

*Primary Examiner* — Courtney Joan Nelson

(57) ABSTRACT
The present invention relates to an image processing system (10), comprising: a processor unit (20) arranged to receive imaging data associated with an imaging system (40) and optical shape sensing data associated with an optical shape sensing system (50) registered with the imaging system (40) such that the optical shape sensing data can be positioned in the imaging system; wherein the processor unit (20) is configured to define in the imaging data a region of interest based on the imaging data and/or the optical shape sensing data and further configured to use the optical shape sensing data as markers within the region of interest such that the processor unit applies image enhancement of imaging data
(Continued)

on the region of interest based on received optical shape sensing data.

20 Claims, 5 Drawing Sheets

(58) Field of Classification Search
CPC ....... A61B 90/37; A61B 8/4254; A61B 34/25;
A61B 2034/107; A61B 2090/376; A61B
2034/2063; A61B 34/10; A61B 6/5264;
A61B 8/463; A61B 2034/2055; A61B
17/3403; A61B 1/0005; A61B 6/481;
G06T 2207/30021; G06T 2207/10116;
G06T 2207/20172; G06T 2207/20182;
G06T 2207/20201; G06T 2207/30204;
G06T 5/50; G06T 5/73; G06T 7/0012;
G06T 5/70; G16H 30/40; G16H 50/50;
G06V 10/25
See application file for complete search history.

(56) References Cited

U.S. PATENT DOCUMENTS

| | | | |
|---|---|---|---|
| 9,918,659 B2 | 3/2018 | Chopra | |
| 11,064,955 B2 * | 7/2021 | Klinder | G06T 19/003 |
| 11,610,329 B2 * | 3/2023 | Ekin | A61B 90/37 |
| 11,779,396 B2 * | 10/2023 | Duindam | G06T 7/30 |
| | | | 600/424 |
| 2009/0169080 A1 * | 7/2009 | Noordhoek | G06T 5/73 |
| | | | 382/131 |
| 2013/0308137 A1 * | 11/2013 | Manzke | A61B 34/20 |
| | | | 356/511 |
| 2017/0265946 A1 * | 9/2017 | Ramachandran | A61B 8/4254 |
| 2017/0281293 A1 | 10/2017 | Verstege | |
| 2018/0008352 A1 | 1/2018 | Flexman | |
| 2018/0206807 A1 * | 7/2018 | Baruth | A61B 6/12 |
| 2018/0256131 A1 | 9/2018 | Bracken | |
| 2019/0213940 A1 | 7/2019 | Veidhes et al. | |
| 2019/0346319 A1 | 11/2019 | Bydlon | |

* cited by examiner

IMAGE ENHANCEMENT BASED ON FIBER OPTIC SHAPE-SENSING

CROSS-REFERENCE TO PRIOR APPLICATIONS

This application is the U.S. National Phase application under 35 U.S.C. § 371 of International Application No. PCT/EP2021/050399, filed on Jan. 11, 2021, which claims the benefit of U.S. Provisional Patent Application No. 62/960,964, filed on Jan. 14, 2020. These applications are hereby incorporated by reference herein.

FIELD OF THE INVENTION

The present invention relates to systems and methods for enhancement of views during interventions for medical imaging system.

BACKGROUND OF THE INVENTION

Minimally invasive interventions can be performed under X-ray guidance. To minimize the amount of radiation, physicians compromise on image quality. Low signal to noise objects in X-ray images, like stent struts and calcifications can be enhanced using image integration, like Stent-Boost: the latter is about stent enhancement in the image by showing finer details of the stent struts, while background noise and anatomical structures are faded out. This only works if images can be correctly superimposed. This implies that markers are identifiable and that motion of the device is not overlay out-of-plane

SUMMARY OF THE INVENTION

It would be advantageous to have improved techniques for image enhancement during interventions.

The object of the present invention is solved with the subject matter of the independent claims, wherein further embodiments are incorporated in the dependent claims.

It should be noted that the following described aspects and examples of the invention apply also to the device, the method, as well as to the computer program element and a computer readable medium.

In a first aspect, there is provided an image processing system, comprising: a processor unit arranged to receive imaging data associated with an imaging system and optical shape sensing data associated with an optical shape sensing system registered with the imaging system such that the optical shape sensing data can be positioned in the imaging system; wherein the processor unit is configured to define in the imaging data a region of interest based on the imaging data and/or the optical shape sensing data and further configured to use the optical shape sensing data as markers within the region of interest such that the processor unit applies image enhancement of imaging data on the region of interest based on received optical shape sensing data.

In this manner, for example, StentBoost improved image quality by identifying markers in an image and using them to perform motion compensation across image frames to then improve image quality. The algorithm struggles when multiple markers are present, when no markers can be seen, or to extrapolate to a more generic marker that cannot be predefined. Combining FORS with StentBoost can address these challenges by limiting the search range in the image and providing 3D localization of devices.

In other words, embedding optical shape sensing ("OSS") fiber in the interventional instrument is provided according to an example of the present invention and using it as marker once co-registered with the imaging system, like for instance interventional X-ray imaging system, magnetic resonance systems or ultrasonic imaging systems.

The present invention advantageously provides that during vascular procedures it can be difficult to obtain high quality images of therapy devices (stents, balloons, endografts, etc.) due to their small size, obstruction by other devices in the field of view, motion artefacts, or just from the anatomy itself. In addition, as devices become smaller and more tissue-like, they also lose some of the features that are visible via imaging.

StentBoost was developed to overcome some of these challenges, however, knowing the exact location of the guidewires, catheters, stents or endografts may further improve the image quality of these types of devices. There are two specific cases that are particularly challenging:

i. When there are multiple markers that are present in the image and it is difficult to identify which ones are associated with the device of interest.
  ii. When the markers are very difficult to visualize in X-ray (e.g. biodegradable stents)
  iii. When enhancing an object or structure that doesn't have known markers (e.g. an anatomical structure such as a cap or a vessel)
  iv. Correcting for motion that is out of plane.

The present invention advantageously provides that the system or device as defined by claim 1 utilizes for instance a FORS device, FORS system, imaging system (e.g. X-ray or ultrasound) and controller, an image processing system, and a visualization system. This invention assumes that the FORS device and the imaging system are co-registered in spatial coordinates.

One aspect of the present invention is for instance provided in how to use the FORS device positional information to enhance image quality in another imaging modality (e.g. X-ray or ultrasound).

Aspects of the present inventions for instance are based on

Providing i) representation of the reconstructed OSS fiber and ii) image of an object, registered one to the other
  Defining region of interest based on data from i)—e.g. around the tip of a OSS guidewire, a balloon, a stent, endograft . . . —automatically or via user interface
  Searching and identifying markers close to the FORS data in that region of interest (i.e. only the markers located on the pathway)—this will discard non-viable markers
  Applying StentBoost on that region of interest (contrast injections from a series of X-Ray images of the same region of interest) based on the identified markers
  Displaying i), ii) superposed with higher contrast in region of interests as a result of StentBoost According to an exemplary embodiment of the present invention, FORS 3D data can be used to further filter-out frames that are out of plane.

According to an exemplary embodiment of the present invention, FORS shape in between 2 markers can be used to evaluate when there are shape changes to the stent (as opposed to the current technique that accounts for translation). Those frames can be dropped, or the FORS can be used to morph the shape of the device to match the other frames.

According to an exemplary embodiment of the present invention, FORS data per se can be used as markers. This will speed up the computation time for image integration and reduce the number of false positive markers and will thereby improve the image quality.

According to an exemplary embodiment of the present invention, known markers (balloon, stent, curved line of the guidewire, endograft, clip or valve device, a vessel outline, vessel bifurcations . . . ) can be recognized in a series of images for StentBoost.

According to an exemplary embodiment of the present invention, by this way calcifications along the vessel and cap morphology of chronic total occlusions may also be visualized.

According to an exemplary embodiment of the present invention, the processor unit is configured to apply the image enhancement to a series of contrast-enhanced X-Ray images of the region of interest taken by the imaging system.

According to an exemplary embodiment of the present invention, the processor unit is configured to search and identify the markers in terms of restricting the markers a subgroup of markers located on the pathway for an interventional instrument.

According to an exemplary embodiment of the present invention, the processor unit is configured to define the region of interest based on a location of a balloon, a stent, an endograft or an interventional instrument.

According to an exemplary embodiment of the present invention, the processor unit is configured to use the optical shape sensing data to filter-out frames of the imaging system that are out of plane.

According to an exemplary embodiment of the present invention, the processor unit is configured to use the optical shape sensing data in between at least two markers to evaluate a shape change of a interventional instrument or the interventional instrument.

According to an exemplary embodiment of the present invention, the processor unit is arranged to receive imaging data associated with the imaging system in terms of a computed tomography system or a magnetic resonance imaging system or an ultrasound or an optical imaging system or a X-ray imaging system or a medical imaging system or a diagnostic imaging system.

According to an exemplary embodiment of the present invention, the processor unit is configured to identify markers in series of images taken by the imaging system.

According to an exemplary embodiment of the present invention, the series of images taken by the imaging system is part of the applied image enhancement on the region of interest.

In a second aspect, there is provided an imaging system configured to communicate with the device according to the first aspect or any implementation of the first aspect.

In a third aspect, there is provided an optical shape sensing system configured to communicate with the device according to the first aspect or any implementation of the first aspect. The optical shape sensing system configured to be registered with the device according to the second aspect or any implementation of the second aspect.

In a fourth aspect, there is provided a method for embedding fiber optic shape sensing in an medical imaging device, the method comprising the following steps of:

As a first step, the following is performed: receiving imaging data associated with an imaging system and optical shape sensing data associated with an optical shape sensing system registered with the imaging system such that the optical shape sensing data can be positioned in the imaging system by means of a processor unit.

As a second step, the following is performed: defining, in the imaging data, a region of interest based on the imaging data and/or the optical shape sensing data and further using the optical shape sensing data as markers within the region of interest such that the processor unit applies image enhancement of imaging data on the region of interest based on received optical shape sensing data by means of the processor unit.

According to an exemplary embodiment of the present invention, the method further includes the step of applying the image enhancement to a series of contrast-enhanced X-Ray images of the region of interest taken by the imaging system.

According to an exemplary embodiment of the present invention, the method further includes the step of applying searching and identifying the markers in terms of restricting the markers a subgroup of markers located on the pathway for an interventional instrument.

According to an exemplary embodiment of the present invention, the method further includes the step of applying searching and identifying the markers in terms of restricting the markers a subgroup of markers located on the pathway for an interventional instrument.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figures 1, 2:
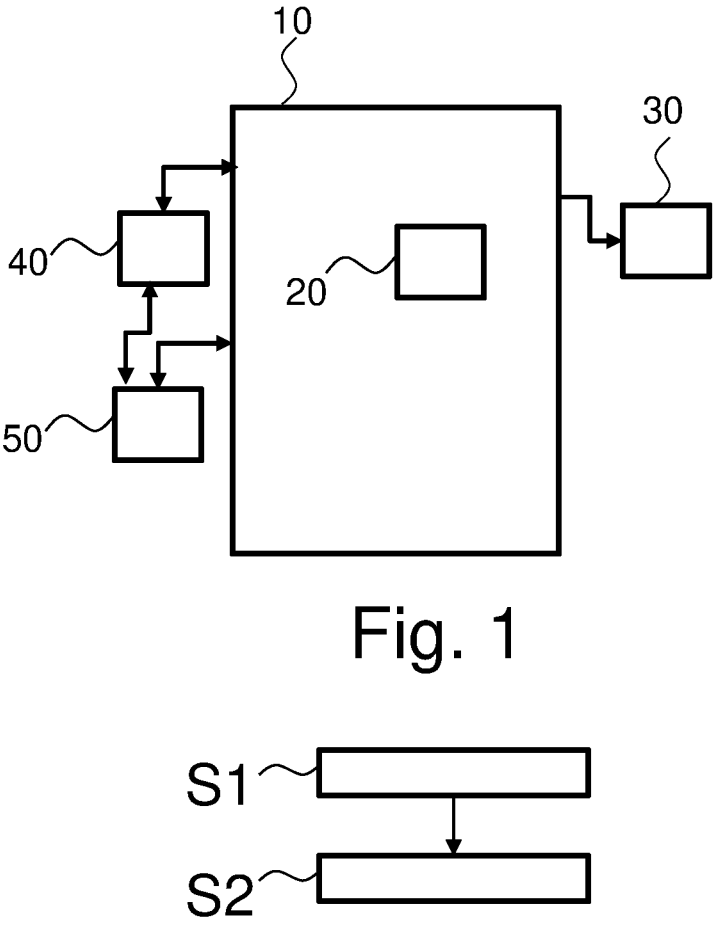
FIG. 1 shows a schematic set up of an image processing system for embedding fiber optic shape sensing in a medical imaging device according to an exemplary embodiment of the present invention.
FIG. 2 shows a method for embedding fiber optic shape sensing in a medical imaging device according to an exemplary embodiment of the present invention.

FIG. 1 shows a schematic set up of an image processing system, for example for embedding fiber optic shape sensing in a medical imaging device, according to an exemplary embodiment of the present invention. The image processing system 10 comprises a processor unit 20. The image processing system 10 is configured to be for example connected to a display unit 30. The image processing system 10 is configured to be connected to an imaging system 40.

The image processing system 10 is configured to be connected to an optical shape sensing system 50 registered with the imaging system 40.

The processor unit 20 is arranged to receive imaging data associated with an imaging system 40 and optical shape sensing data associated with an optical shape sensing system 50 registered with the imaging system 40 such that the optical shape sensing data can be positioned in the imaging system;

The processor unit 20 is configured to define in the imaging data a region of interest based on the imaging data and/or the optical shape sensing data and further configured to use the optical shape sensing data as markers within the region of interest such that the processor unit applies image enhancement of imaging data on the region of interest based on received optical shape sensing data.

FIG. 2 shows a method for embedding fiber optic shape sensing in a medical imaging device according to an exemplary embodiment of the present invention. The method comprises:

As a first step, the following is performed: receiving S1 imaging data associated with an imaging system and optical shape sensing data associated with an optical shape sensing system registered with the imaging system such that the optical shape sensing data can be positioned in the imaging system by means of a processor unit.

As a second step, the following is performed: defining S2, in the imaging data, a region of interest based on the imaging data and/or the optical shape sensing data and further using the optical shape sensing data as markers within the region of interest such that the processor unit applies image enhancement of imaging data on the region of interest based on received optical shape sensing data by means of the processor unit.

Figure 3:
FIG. 3 shows an example an optical shape sensed devices overlaid upon a preoperative CT showing their position inside the vasculature according to an exemplary embodiment of the present invention.

FIG. 3 shows an example an optical shape sensed devices overlaid upon a preoperative CT showing their position inside the vasculature according to an exemplary embodiment of the present invention.

According to an exemplary embodiment of the present invention, the Fiber Optical RealShape, FORS, uses light along a multicore optical fiber for device localization and navigation during surgical intervention.

According to an exemplary embodiment of the present invention, the principle involved makes use of distributed strain measurements in the optical fiber using characteristic Rayleigh backscatter or controlled grating patterns.

According to an exemplary embodiment of the present invention, the shape along the optical fiber begins at a specific point along the sensor, known as the launch or z=0, and the subsequent shape position and orientation are relative to that point.

According to an exemplary embodiment of the present invention, the optical shape sensing fibers can be integrated into medical devices in order to provide live guidance of the devices during minimally invasive procedures.

According to an exemplary embodiment of the present invention, the integrated fiber provides the position and orientation of the entire device.

FIG. 3 shows a shape-sensed guidewire and shape-sensed catheter used for navigation to the left renal artery overlaid upon a pre-operative CT image.

Figure 4:
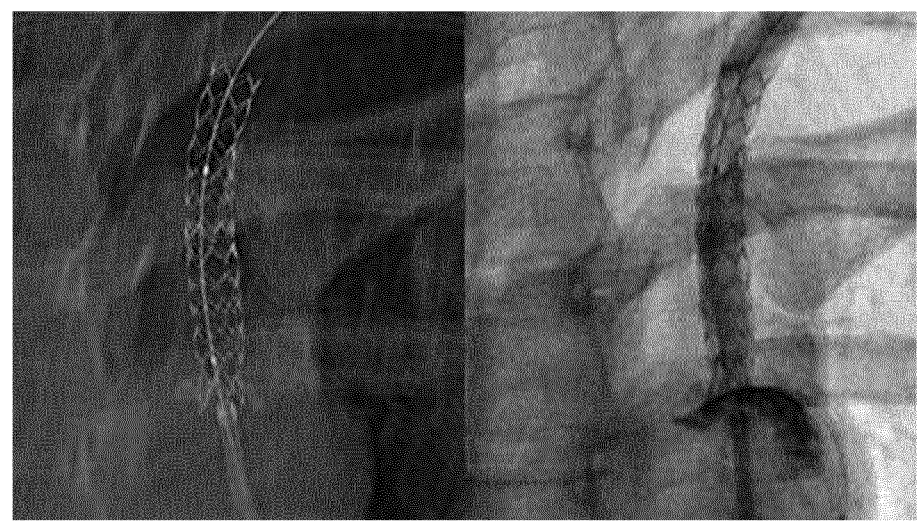
FIG. 4 shows an example of an image of StentBoost showing better image quality of the stent according to an exemplary embodiment of the present invention.

FIG. 4 shows an example of an image of StentBoost showing better image quality of the stent according to an exemplary embodiment of the present invention; and According to an exemplary embodiment of the present invention, the enhancement is provided by StentBoost which as such is a tool that enhances stent visualization in relation to the vessel walls.

According to an exemplary embodiment of the present invention, the stent is enhanced in the image by showing finer details of the stent struts, while background noise and anatomical structures are faded out. This enables more precise positioning of the stent and the ability to correct for under-deployment immediately.

According to an exemplary embodiment of the present invention, the StentBoost is used in terms of the product that improves the image quality of stents. It localizes the marker bands of the stent in each image frame, compensates for any motion, and then averages across the image frames to improve the contrast of the image. StentBoost is described in U.S. Pat. No. 728,962 B2: Medical Viewing System and Method for Detecting and Enhancing Structures in Noisy Images.

According to an exemplary embodiment of the present invention, the enhancement or StentBoost takes a series of X-ray images and localizes a known marker (e.g. balloon/stent markers) to use for co-registration of a series of images. This technique fails when there are multiple markers present in the image. In this case, the FORS-enabled guidewire can be used to limit the search range for markers, as those markers will lie along the path of the guidewire. The search range can be determined around the FORS wire based on:

Device type, e.g. narrow search for a stent/balloon, wider search for an endograft;

Estimated FORS error, e.g. as a function of curvature, twist, length along the device;

User-defined search region

Imaging system settings, e.g. pixel resolution, type of imaging protocol;

This technique still uses the markers in the, for example X-ray or ultrasound, image for motion compensation and reduces the accuracy requirements on the FORS device. The FORS device and x-ray system must be co-registered so that the coordinate systems are aligned.

Figure 5:
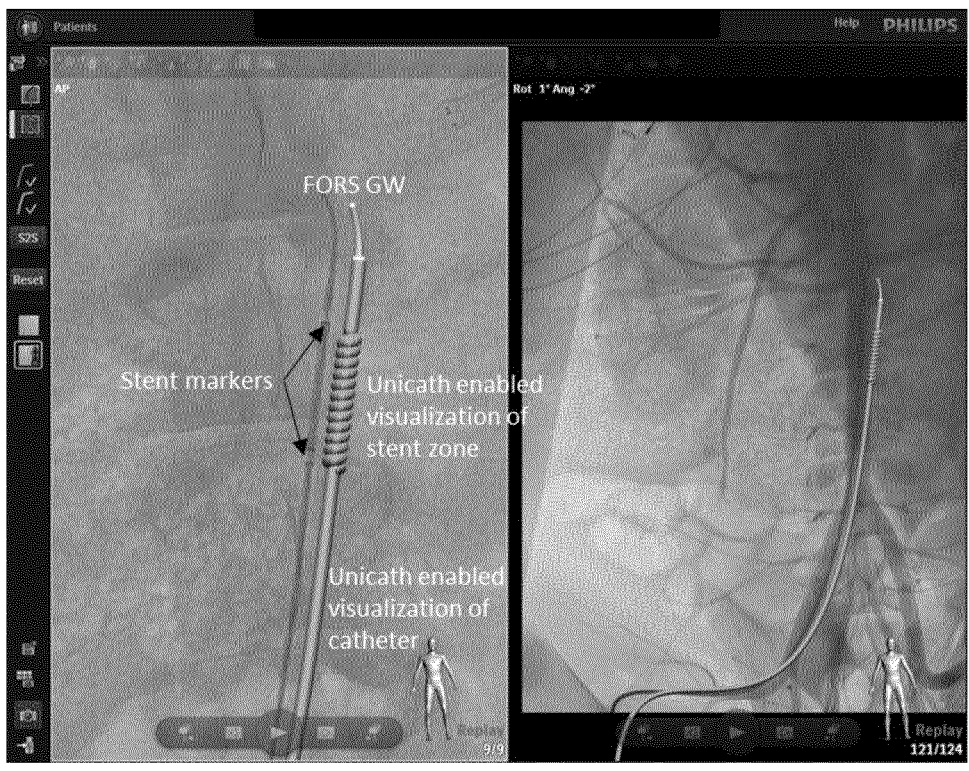
FIG. 5 shows an example of defining a local region for enhancement based on FORS device and therapy device positions according to an exemplary embodiment of the present invention.

FIG. 5 shows an example of defining a local region for enhancement based on FORS device and therapy device positions according to an exemplary embodiment of the present invention.

FIG. 5 shows an example of FORS GW that can be used to localize the stent markers in the X-ray image. The FORS device is a guidewire used in combination with a UniCath hub to define the location of the stent. The region of the stent is used to define the search range for the stent markers.

In the case where motion compensation is performed using the markers in the image, it is still challenging to account for out-of-plane motion. According to an exemplary embodiment of the present invention, the FORS 3D position can be used to filter out frames that are out of plane and to not include them in the averaging, or, to correct for the scaling that the out-of-plane motion will impact.

According to an exemplary embodiment of the present invention, the FORS shape in between the two markers can be used to evaluate when there are shape changes to the stent (as opposed to the current technique that accounts for translation). Those frames can be dropped, or the FORS can be used to morph the shape of the device to match the other frames.

According to an exemplary embodiment of the present invention, there are limited markers in the image that capture the device (e.g. bio-degradable stents). In this case the FORS position and shape of one or more nodes can be used directly as a localizer for motion compensation.

According to an exemplary embodiment of the present invention, the FORS device and imaging system are co-registered so that the coordinate systems are aligned.

According to an exemplary embodiment of the present invention, the FORS accuracy will be a limiting factor in the performance of this strategy. There are some additional approaches that can be used to improve accuracy specifically for the purpose of improving performance during the Stent-Boost.

According to an exemplary embodiment of the present invention, the FORS accuracy is high immediately following registration, so this method could include an automatic registration step (including multiple image projections if necessary) in order to correct for FORS error prior to the StentBoost algorithm.

According to an exemplary embodiment of the present invention, the FORS relative accuracy is also high in comparison to absolute accuracy. So the relative FORS motion can be used to correct for the device movement as opposed to the absolute FORS position.

According to an exemplary embodiment of the present invention, the enhancement or StentBoost takes a series of X-ray images and localizes a known marker (e.g. balloon/stent markers) to use for co-registration of a series of images. This technique can be generalized to auto-identify suitable localizers in the image to be used as markers for motion compensation provided that the region for stabilization is restricted to relevant parts of the image. In this case, the FORS-enabled device can be used to establish a search region for localizers along the path of the guidewire. This technique then uses those auto-generated localizers in the (e.g. x-ray or ultrasound) image for motion compensation and reduces the accuracy requirements on the FORS device.

According to an exemplary embodiment of the present invention, the FORS device and imaging system must be co-registered so that the coordinate systems are aligned.

Localizers can be both anatomical or device based, such as:

A curved line of the guidewire

Markers on an endograft

A clip or valve device

A vessel outline in a DSA (at the tip of a FORS catheter) or vessel bifurcations The system can also have a library of pre-defined localizers to search for in the vicinity of the device, such as radio-opaque marker bands, fenestrations, mitraclip, etc. Alternatively the system can have a pre-defined set of typical features (e.g. edges, lines, dots, that it then automatically finds and identifies within the vicinity of the device).

Figure 6:
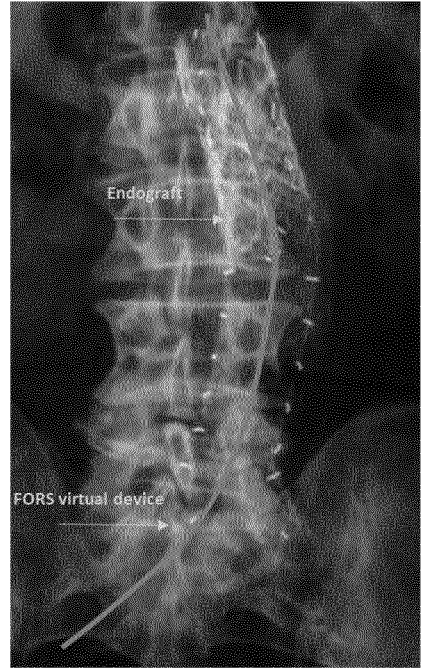
FIG. 6 shows an example of using the local region around the FORS device in combination with a therapy device to restrict region of x-ray image for image processing according to an exemplary embodiment of the present invention.
Figure 6:
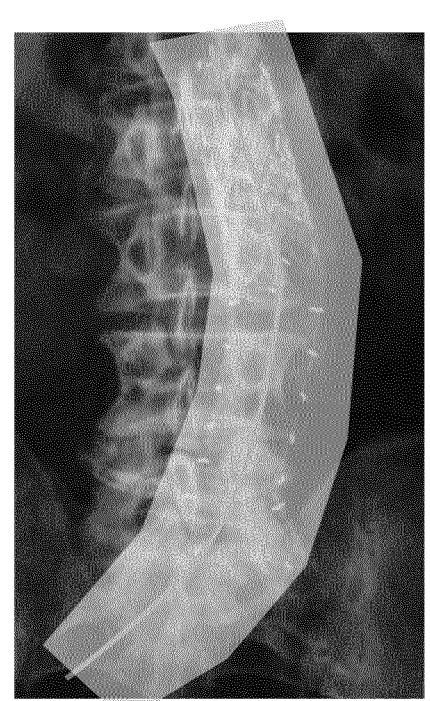

FIG. 6 shows an example of using the local region around the FORS device in combination with a therapy device to restrict region of x-ray image for image processing according to an exemplary embodiment of the present invention.

FIG. 6 shows an example of FORS GW that can be used to identify a search range and then identify localizers in the vicinity of the wire on the endograft for use in stabilizing the image.

The present invention can be applied to many applications such as vascular (guidewire, catheters, stent sheaths, deployment systems, etc.), endoluminal (endoscopes or bronchoscopes), orthopedic (k-wires & screwdrivers) as well as non-medical applications.

In another exemplary embodiment, the present invention can apply to both Rayleigh (enhanced and regular) as well as Fiber Bragg implementations of shape sensing fiber. It also applies to both manual and robotic manipulation of such devices.

In another exemplary embodiment, the present invention can apply to any imaging system used in conjunction with FORS including X-ray, ultrasound, MRI, CT, OCT, IVUS, endoscopy, etc.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above.

Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses the invention.

Further on, the computer program element might be able to provide all necessary steps to fulfill the procedure of an exemplary embodiment of the method as described above.

According to a further exemplary embodiment of the present invention, a non-transitory computer readable medium, such as a CD-ROM, USB stick or the like, is presented wherein the non-transitory computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An image processing system, comprising:
   a processor unit arranged to receive imaging data associated with an imaging system and optical shape sensing data associated with an optical shape sensing system registered with the imaging system, such that the optical shape sensing data can be positioned in the imaging data, wherein the imaging data comprise a series of X-Ray images taken by the imaging system; and
   wherein the processor unit is configured to define in the imaging data a region of interest based on the imaging data and/or the optical shape sensing data and is further configured to use the optical shape sensing data as markers within the region of interest such that the processor unit applies image enhancement of the series of X-Ray images of the region of interest based on received optical shape sensing data, the image enhancement comprises motion compensation in the series of X-ray images based on the received optical shape sensing data; wherein the markers: are nodes with position and shape used directly as localizers for co-registering the series of X-ray images with each other for motion compensation; or the markers establish a region in which predetermined image localizers can be searched in the series of X-ray images for co-registering the series of X-ray images for motion compensation.

2. The image processing system according to claim 1, wherein the series of X-Ray images are a series of contrast-enhanced X-Ray images of the region of interest taken by the imaging system.

3. The image processing system according to claim 1, wherein the processor unit is configured to search and identify the markers in terms of restricting the markers a subgroup of markers located on a pathway for an interventional instrument.

4. The image processing system according to claim 1, wherein the processor unit is configured to define the region of interest based on a location of a balloon, a stent, an endograft or an interventional instrument.

5. The image processing system according to claim 1, wherein the processor unit is configured to use the optical shape sensing data to filter-out frames of the imaging system that are out of plane.

6. The image processing system according to claim 1, wherein the processor unit is configured to use the optical shape sensing data in between at least two markers to evaluate a shape change of an interventional instrument.

7. The image processing system according to claim 1, wherein the processor unit is arranged to receive imaging data associated with the imaging system in terms of a computed tomography system or a magnetic resonance imaging system or an ultrasound or an optical imaging system or a X-ray imaging system or a medical imaging system or a diagnostic imaging system.

8. The image processing system according to claim 1, wherein the processor unit is configured to identify markers in series of X-ray images taken by the imaging system.

9. The image processing system according to claim 8, wherein the series of X-ray images taken by the imaging system is part of the applied image enhancement on the region of interest.

10. An imaging system configured to communicate with the image processing system according to claim 9.

11. An optical shape sensing system configured to communicate with the image processing system according to claim 9.

12. A method for embedding fiber optic shape sensing in a medical imaging device, the method comprising:
   receiving imaging data associated with an imaging system and optical shape sensing data associated with an optical shape sensing system registered with the imaging system such that the optical shape sensing data can be positioned in the imaging data by a processor unit, wherein the imaging data comprise a series of X-Ray images taken by the imaging system;
   defining, in the imaging data, a region of interest based on the imaging data and/or the optical shape sensing data and further using the optical shape sensing data as markers within the region of interest such that the processor unit applies image enhancement of the series of X-Ray images of the region of interest based on received optical shape sensing data by the processor unit, wherein the image enhancement comprises motion compensation in the series of X-ray images based on the received optical shape sensing data; wherein said markers: are nodes with position and shape used directly as localizers for co-registering the series of X-ray images with each other for motion compensation; or the markers establish a region in which predetermined image localizers can be searched in the series of X-ray images for co-registering the series of X-ray images for motion compensation;
   receiving optical shape sensing data of the optical shape sensing fiber by the processor; and
   applying co-registering and motion compensation on the region of interest based on the received optical shape sensing data by the processor.

13. The method according to claim 12, wherein the method further comprises the step of applying the image enhancement to a series of contrast-enhanced X-Ray images of the region of interest taken by the imaging system.

14. The method according to claim 12, wherein the method further comprises the step of applying searching and identifying the markers in terms of restricting the markers a subgroup of markers located on pathway for an interventional instrument.

15. A non-transitory computer storage medium that stores instructions, which when executed by a processor, causes the processor to:
   receive imaging data associated with an imaging system and optical shape sensing data associated with an optical shape sensing system registered with the imaging system such that the optical shape sensing data adapted to be positioned in the imaging data, wherein the imaging data comprise a series of X-Ray images taken by the imaging system;
   define, in the imaging data, a region of interest based on the imaging data and/or the optical shape sensing data and further using the optical shape sensing data as markers within the region of interest such that the processor applies image enhancement of the series of X-Ray images of the region of interest based on received optical shape sensing data, the image enhancement comprising motion compensation in the series of X-ray images based on the received optical shape sensing data, wherein markers:

are nodes with position and shape used directly as localizers for co-registering the series of X-ray images for motion compensation, or the markers establish a region in which predetermined image localizers can be searched in the series of X-ray images for co-registering the series of X-ray images with each other for motion compensation;

optical shape sensing data of the optical shape sensing fiber; and apply image co-registering and motion compensation on the region of interest based on the received receive optical shape sensing data.

16. The non-transitory computer readable medium according to claim 15, wherein the series of X-Ray images a series of contrast-enhanced X-Ray images of the region of interest taken by the imaging system.

17. The non-transitory computer readable medium according to claim 15, wherein the instructions further cause the processor to search and identify the markers in terms of restricting the markers a subgroup of markers located on a pathway for an interventional instrument.

18. The non-transitory computer readable medium according to claim 15, wherein the instructions further cause the processor to define the region of interest based on a location of a balloon, a stent, an endograft or an interventional instrument.

19. The non-transitory computer readable medium according to claim 15, wherein the instructions further cause the processor to use the optical shape sensing data to filter-out frames of the imaging system that are out of plane.

20. The non-transitory computer readable medium according to claim 15, wherein the instructions further cause the processor to use the optical shape sensing data in between at least two markers to evaluate a shape change of an interventional instrument.

* * * * *